United States Patent
Seguin et al.

(10) Patent No.: US 12,427,440 B2
(45) Date of Patent: Sep. 30, 2025

(54) FLUID TREATMENT SYSTEM, SEPARATOR AND METHOD USING A MAGNETIC FIELD

(71) Applicant: RJ Enterprises Inc., Delta (CA)

(72) Inventors: Ronald J. Seguin, Delta (CA); Roderick Michael Facey, Edmonton (CA)

(73) Assignee: RJ Enterprises Inc., Delta (CA)

( * ) Notice: Subject to any disclaimer, the term of this patent is extended or adjusted under 35 U.S.C. 154(b) by 0 days.

(21) Appl. No.: 17/178,074

(22) Filed: Feb. 17, 2021

(65) Prior Publication Data

US 2022/0219099 A1    Jul. 14, 2022

(30) Foreign Application Priority Data

Jan. 11, 2021   (CA) ................... CA 3105544

(51) Int. Cl.
  *B01D 17/04* (2006.01)
  *B01D 17/02* (2006.01)
  (Continued)

(52) U.S. Cl.
  CPC ......... *B01D 17/04* (2013.01); *B01D 17/0205* (2013.01); *B03C 1/033* (2013.01); *B03C 1/288* (2013.01); *B03D 1/247* (2013.01); *C02F 1/482* (2013.01); *C02F 1/485* (2013.01); *H01F 7/02* (2013.01); *H01F 7/06* (2013.01);
  (Continued)

(58) Field of Classification Search
  CPC .... B01D 17/04; B01D 17/0205; B03C 1/033; B03C 1/288; B03C 1/0335; B03C 1/0332; B03C 2201/18; B03C 2201/22; B03D 1/247; B03D 1/02; B03D 1/1431; B03D 2203/006; B03D 2203/008; C02F 1/482;
  (Continued)

(56) References Cited

U.S. PATENT DOCUMENTS

| 3,318,448 A | 5/1967 | Fryer |
| 3,526,585 A | 9/1970 | Camp |

(Continued)

FOREIGN PATENT DOCUMENTS

| CA | 2531007 A1 | 12/2007 |
| CA | 2857843 A1 | 2/2015 |

(Continued)

OTHER PUBLICATIONS

Black Powder Solutions: Magnetic Separator; Case Studies, News, News Releases: Posted on Jul. 7, 2020; p. 1-11.

(Continued)

*Primary Examiner* — Liam Royce
(74) *Attorney, Agent, or Firm* — CHRISTENSEN O'CONNOR JOHNSON KINDNESS PLLC

(57) ABSTRACT

There is provided a fluid treatment separator and a method of treating fluid such as tailings from tailings ponds resulting from oil sands production. A fluid treatment separator may be used for treatment of a mixture containing at least oil and water. The separator includes a mixing chamber, an inlet and at least one outlet. The mixing chamber defines a flow path between the inlet and the at least one outlet. The inlet includes a nozzle arranged to introduce turbulence to the mixture along the flow path. At least one magnet is arranged to apply a magnetic field to the mixture along the flow path.

19 Claims, 4 Drawing Sheets

(51) Int. Cl.
*B03C 1/033* (2006.01)
*B03C 1/28* (2006.01)
*B03D 1/24* (2006.01)
*C02F 1/48* (2023.01)
*H01F 7/02* (2006.01)
*H01F 7/06* (2006.01)
*C02F 101/32* (2006.01)
*C02F 103/10* (2006.01)

(52) U.S. Cl.
CPC ...... *B03C 2201/18* (2013.01); *B03C 2201/22* (2013.01); *B03D 2203/006* (2013.01); *C02F 2101/32* (2013.01); *C02F 2103/10* (2013.01)

(58) Field of Classification Search
CPC .. C02F 1/485; C02F 2101/32; C02F 2103/10; H01F 7/02; H01F 7/06; H01F 7/0294
See application file for complete search history.

(56) References Cited

U.S. PATENT DOCUMENTS

| | | | |
|---|---|---|---|
| 3,623,608 A | | 11/1971 | Waterman |
| 3,764,008 A | * | 10/1973 | Darley .................... E21B 43/35 210/709 |
| 3,784,468 A | | 1/1974 | Garcia |
| 3,986,954 A | * | 10/1976 | George ................ B03D 1/1431 210/706 |
| 4,051,023 A | * | 9/1977 | Fogle ........................ B03C 1/14 210/222 |
| 4,151,090 A | * | 4/1979 | Brigante ................ C02F 1/485 210/243 |
| 4,545,892 A | | 10/1985 | Lubomyr et al. |
| 4,783,268 A | | 11/1988 | Leung |
| 4,913,814 A | | 4/1990 | Singh et al. |
| 4,946,590 A | * | 8/1990 | Hertzog ................ C02F 1/482 210/232 |
| 4,971,703 A | | 11/1990 | Sealock, Jr. et al. |
| 5,069,751 A | * | 12/1991 | Chamblee ............ B03D 1/1425 210/512.1 |
| 5,110,457 A | | 5/1992 | Krawl et al. |
| 5,224,604 A | * | 7/1993 | Duczmal .................... B03C 1/30 209/127.1 |
| 5,460,270 A | | 10/1995 | Chan et al. |
| 5,484,534 A | | 1/1996 | Edmondson |
| 5,516,434 A | | 5/1996 | Cairo, Jr. et al. |
| 5,811,013 A | | 9/1998 | Ito |
| 5,873,980 A | | 2/1999 | Young et al. |
| 5,879,541 A | | 3/1999 | Parkinson |
| 5,935,445 A | | 8/1999 | Febres |
| 6,004,455 A | | 12/1999 | Rendall |
| 6,527,960 B1 | | 3/2003 | Bacon et al. |
| 6,821,060 B2 | | 11/2004 | McTurk et al. |
| 7,360,657 B2 | | 4/2008 | Oder et al. |
| 7,416,671 B2 | | 8/2008 | Bozak et al. |
| 8,834,724 B1 | | 9/2014 | Richerand |
| 9,169,717 B2 | | 10/2015 | Levey et al. |
| 9,381,520 B2 | | 7/2016 | Cox et al. |
| 9,844,782 B2 | | 12/2017 | Emburgh et al. |
| 10,239,768 B2 | | 3/2019 | Bozak |
| 10,322,417 B2 | | 6/2019 | Ellis |
| 10,654,727 B2 | | 5/2020 | Bozak |
| 2009/0065417 A1 | * | 3/2009 | Menju ...................... B03C 1/32 210/512.3 |
| 2009/0152176 A1 | * | 6/2009 | Kipp ..................... B03C 1/0332 209/636 |
| 2011/0272362 A1 | | 11/2011 | Sikes et al. |
| 2012/0145642 A1 | | 6/2012 | Bozak |
| 2012/0255872 A1 | | 10/2012 | Smith et al. |
| 2012/0325744 A1 | | 12/2012 | Polizzotti et al. |
| 2013/0284677 A1 | | 10/2013 | Snydmiller et al. |
| 2016/0008821 A1 | * | 1/2016 | Yount .................. B03C 1/0332 210/222 |

FOREIGN PATENT DOCUMENTS

| | | |
|---|---|---|
| DE | 4312725 C1 | 3/1994 |
| WO | 2011082498 A1 | 7/2011 |
| WO | 2012000116 A1 | 1/2012 |
| WO | 2012116442 A1 | 9/2012 |

OTHER PUBLICATIONS

Demulsification of Water-in-Oil Emulsions by Exposure to Magnetic Field; Journal of Petroleum Science and Engineering; vol. 179; Aug. 2019; Abstract only.

David Hutchins: Continuous Flow Process for Recovery of Metal Contaminants From Industrial Wastewaters With Magnetic Nanocomposites; Montana Tech Library; Graduate Theses and Non-Theses 183; (2018); downloaded from https://digitalcommons.mtech.edu/grad_rsch/183; p. 1-178.

Lin Liu et al; Innovative Design and Study of an Oil-Water Coupliing Separation Magnetic Hydrocyclone; Separation and Purification Technology; vol. 213; Apr. 15, 2019; Abstract only.

Downloaded from www.magneticholdcompany.com; Oil & Gas Magnetic Separators; Nov. 5, 2020; 1 page.

Downloaded from www.collectionscanada.gc: Innovation and New Technology: Research and Innovation: The Karl Clark Process; Jul. 3, 2013; p. 1-2.

MKI Slop Oil Plant: Capacity Range 5 M3 to 15 M3/Hr, G-force Consulting Engineers, Alphen aan de Rijn, Netherlands, n.d., <http://www.g-forcebv.com>, at least as early as Sep. 9, 2015, 2 pages.

Slop Oil Recovery, GEA Mechanical Equipment GmbH, Oelde, Germany, <http://novacro.com.ar/archivos/241_1380401851_slop-oil-recovery-OI-12-07-0009.pdf>, at least as early as Sep. 9, 2015, 6-page brochure.

* cited by examiner

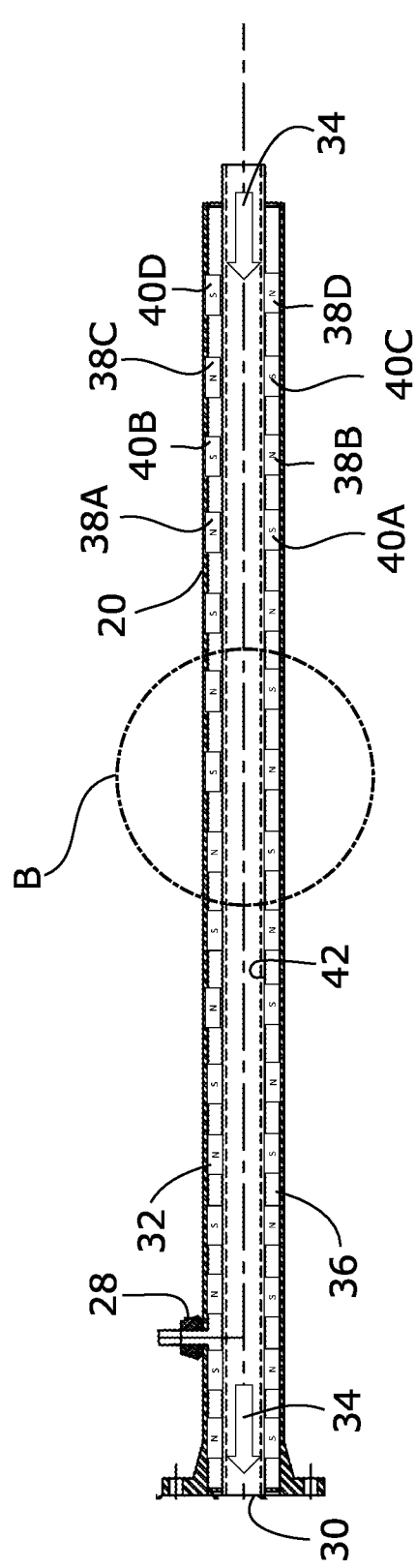
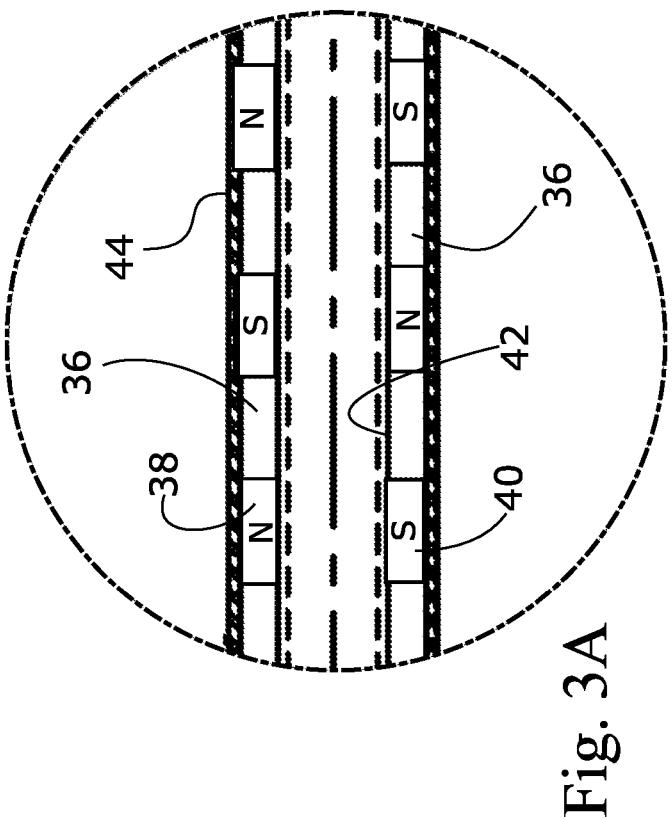
Fig. 3
Fig. 3A

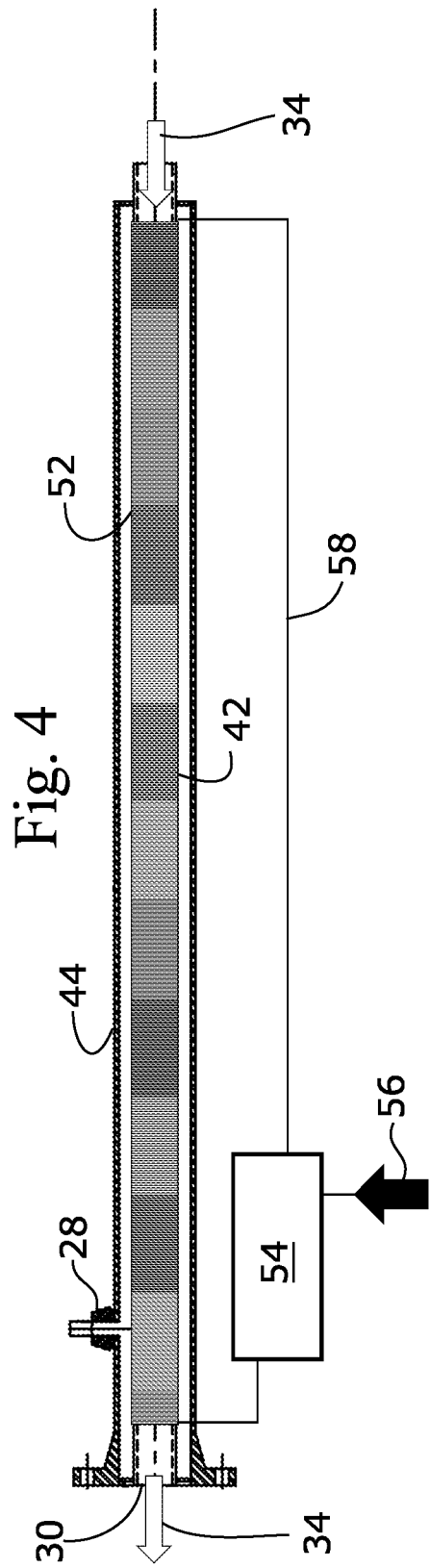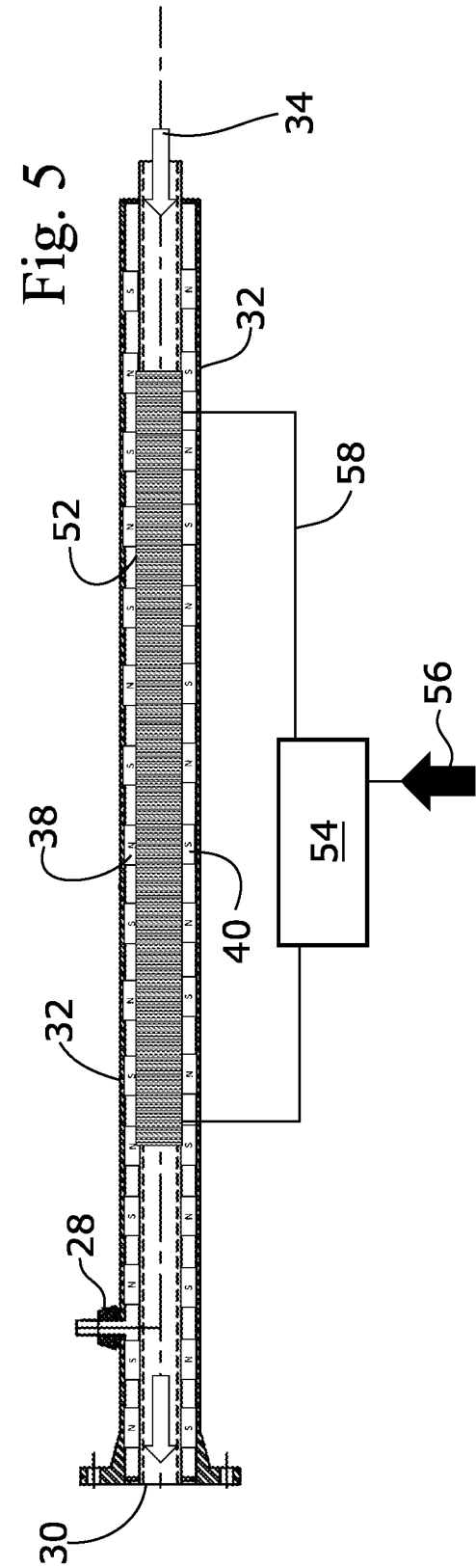

FLUID TREATMENT SYSTEM, SEPARATOR AND METHOD USING A MAGNETIC FIELD

TECHNICAL FIELD

Fluid treatment using a magnetic field. In particular, treatment of oily produced water, for example hydraulic fracturing operations or bitumen/oil laden tailings, for example tailings from tailings ponds resulting from oil sands production.

BACKGROUND

Fluid treatment may be useful to separate mixtures containing oil and water or oil, water and solids. For example, in oil sands production, bitumen may be extracted from a mixture that is approximately 10% bitumen, 80% sand, and 10% fine tailings. Following extraction using a water-based process, the fine tailings, consisting of 5 to 10% bitumen, 35% solids and 55 to 65% water, are generally deposited in a tailings pond. However, fine tailings will not fully settle in these tailing ponds. It is believed that the electrostatic interactions between the suspended particles, which are still partly contaminated with hydrocarbons, prevent this from occurring. These tailing ponds have become an environmental liability for the companies responsible.

Oily produced water derived from hydraulic fracturing, depending on the oil droplet size, can be difficult to separate the oil from water. Oil droplets that are typically smaller than 100 microns are difficult to separate by gravity, require the use of complex and expensive technologies, making water recycle cost ineffective. Removal of residual oil from produced water derived from hydraulic fracturing is necessary if the water is to be recycled for fracking. The presence of residual oil can retard fracking chemicals added to the recycled water prior to fracking. Chemical retardation will have adverse effect on hydraulic fracking performance.

Operators of hydraulic fracturing operations have found it to be absolutely critical to responsibly and economically manage water. Water resources and the supply of fresh water are not unlimited. The beneficial intangibles of treating and recycling produced water for hydraulic fracturing are many. Essential in the development of a plan to recycle produced water is the deployment of a low cost, high performance water treatment technology capable of removing both residual free oil and suspended solids. The technology must be capable of recovering the contaminants as a residual oil in high, relative clean concentrations that will permit its reuse as value-added stream.

The oil sands tailings ponds constitute an unanticipated but persistent environmental and economic problem. They reflect process deficiencies in the bitumen extraction methods currently used. The problem has been mitigated by the industries to some degree, but there are several ponds that still present a major challenge for reclamation. Recent studies have been published that address the treatment of tailings as they are produced, in order to avoid the need for the large settling and storage areas.

SUMMARY

There is provided in an embodiment a fluid treatment separator for treatment of a mixture containing at least oil and water. The fluid treatment separator has mixing chamber, an inlet and at least one outlet. The mixing chamber defines a flow path between the inlet and the at least one outlet. The inlet includes a nozzle arranged to introduce turbulence to the mixture along the flow path. At least one magnet is arranged to apply a magnetic field to the mixture along the flow path.

In various embodiments, there may be included any one or more of the following features: the at least one magnet comprises a plurality of permanent magnets; the plurality of permanent magnets comprises neodymium magnets; the mixing chamber comprises an inner housing and the at least one magnet are mounted exterior to the inner housing; the mixing chamber is cylindrical and the at least one magnet are mounted to the inner housing of the mixing chamber and have a radius of curvature matching a radius of curvature of the inner housing; the mixing chamber further comprises an outer housing and the plurality of permanent magnets are mounted between the inner housing and the outer housing; the plurality of permanent magnets comprise a plurality of magnet pairs arranged along a length of the mixing chamber, each one of each pair of the plurality of magnet pairs having complementary polarity to the other of the pair; each pair of the plurality of magnet pairs is mounted on sides of the mixing chamber at a certain distance along the length of the mixing chamber, and in which each magnet pair of the magnet pairs have reversed polarities to an adjacent pair; each pair of the plurality of magnet pairs together fully extend around the mixing chamber; a plurality of inert spacers placed between adjacent pairs of the plurality of magnet pairs along the length of the mixing chamber; the at least one magnet comprises an electromagnet; a transformer connected to the electromagnet, and the transformer configured to receive power from a power source; the at least one magnet comprises a combination of permanent magnets and at least one electromagnet; the nozzle is a jet nozzle arranged to induce mixing of the mixture with a gas; a return loop of piping connecting one of the at least one outlets with the inlet to provide a return path to allow the application of the magnetic field to the mixture through the mixing chamber in multiple passes; and an inlet pipe for connecting the inlet to a feed of untreated tailings.

There is provided a fluid treatment system including a first fluid treatment separator as described in the two preceding paragraphs and a second fluid treatment separator as described in the two preceding paragraphs, in which one of the at least one outlets of the first fluid treatment separator is in fluid connection with the inlet of the second fluid treatment separator.

In various embodiments, there may be included any one or more of the following features: a separation vessel downstream from one of the at least one outlets of the second fluid treatment separator.

There is provided in an embodiment a method for fluid treatment of a mixture containing at least oil and water. The mixture is supplied into an inlet of a phase separation device via a nozzle, thereby inducing turbulence in the mixture. The phase separation device has a mixing chamber. The mixing chamber defines a flow path between the inlet and at least one outlet. A magnetic field is applied to the mixture inside the mixing chamber of the phase separation device to cause at least partial separation of the oil and water of the mixture.

In various embodiments, there may be included any one or more of the following features: the at least one magnet comprises a plurality of permanent magnets; the plurality of permanent magnets further comprises a plurality of magnet pairs and the magnetic field is produced by the plurality of magnet pairs arranged along a length of the mixing chamber, each one of a pair of the magnet pairs having a complementary polarity to the other of the pair; the magnetic field further comprises applying the magnetic field with reversed polarities for each adjacent pair of the plurality of magnet pairs; the permanent magnets comprise neodymium magnets; the at least one magnet comprises an electromagnet; the at least one magnet comprises a combination of permanent magnets and at least one electromagnet; supplying the mixture into the inlet of the phase separation device via the nozzle further comprises mixing of the mixture with a gas; supplying the mixture into the inlet of the phase separation device further comprises supplying a previously treated mixture containing at least oil and water into the inlet; and the previously treated mixture had previously been treated by passing through the flow path of the phase separation device.

These and other aspects of the device and method are set out in the claims, which are incorporated herein by reference.

BRIEF DESCRIPTION OF THE FIGURES

Embodiments will now be described with reference to the figures, in which like reference characters denote like elements, by way of example, and in which:

FIG. 3 is a schematic section view of a mixing chamber having a permanent magnet installation;

FIG. 3A is an enlarged view of a portion of the mixing chamber of FIG. 3 showing Detail B;

FIG. 4 is a schematic section view of a mixing chamber having an AC electromagnet installation;

FIG. 5 is a schematic section view of a mixing chamber having a permanent magnet and AC electromagnet installation;

DETAILED DESCRIPTION

Tailings may contain primarily both hydrocarbons and solids, for example mineral material, such as rock, sand, silt, and clay. Because of the hydrocarbon contamination of the tailings stored in tailings ponds, the process below is particularly useful in reclaiming these ponds by removing the hydrocarbon contamination, and using the decontaminated tailings to return land to its natural state. However, the apparatus and method may also be applied to any fluid having components to be separated, such as an oil-water mixture, or oil-water-solid mixture, and oil including hydrocarbons, so long as the fluid is sufficiently affected by magnetic fields, which may depend on the characteristics of the fine tailings or on dissolved ions in the fluid. In some embodiments the apparatus and method may treat emulsions, for example directly from the field bypassing a free water knock out. In some embodiments feed is supplied from a tank farm on site. The fluid to be treated may comprise tailings from deep within a tailings pond, without dilution, so long as the tailings are pumpable. If the tailings are not pumpable, they may be made pumpable by dilution with water. Fluid from a skim oil tank may be treated. In general, the apparatus and method disclosed herein may be used to separate immiscible fluids such as oil and water.

Canadian Patent No. 2,689,729, which is incorporated herein by reference, discloses a fluid treatment device for treating any fluid having components to be separated, such as an oil-water mixture, or oil-water-solid mixture, and oil including hydrocarbons. The fluid treatment device shown in Canadian Patent No. 2,689,729 discloses various pumps, ports and flotation tanks which may be used in conjunction with the fluid treatment device separator herein.

Figure 1:
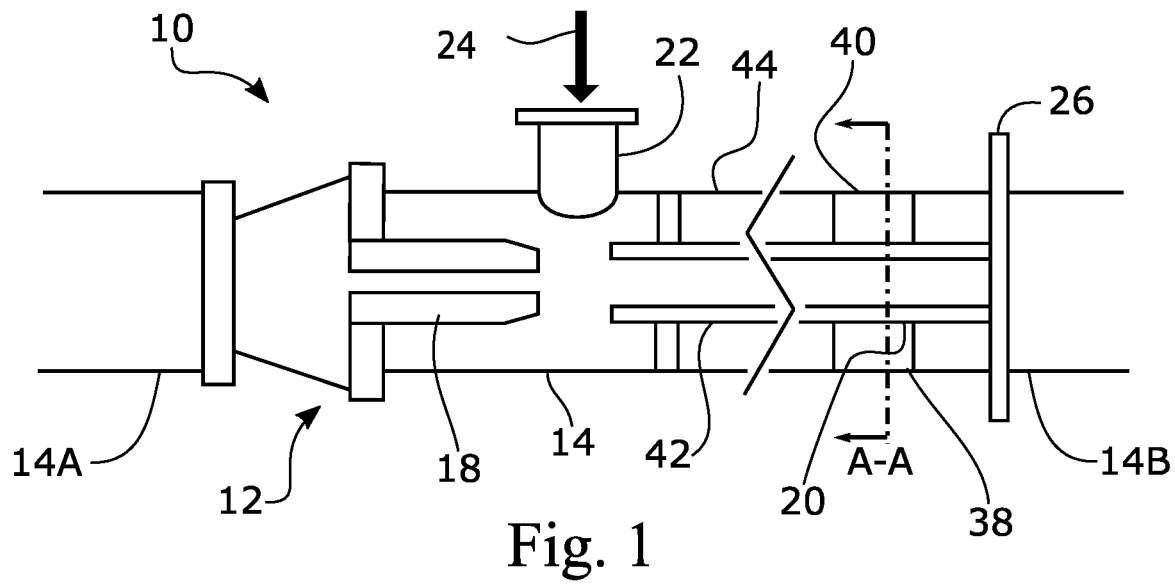
FIG. 1 is a detailed schematic, not to scale, of a fluid treatment separator.

In the embodiment in FIG. 1, a fluid treatment separator 10 has a mixing chamber 20, an inlet 12 and at least one outlet. The at least one outlet may include outlets 28, 30 (FIG. 3). The fluid treatment separator 10 has a conduit 14 between the inlet 12 and a downstream end 14B. The mixing chamber 20 may terminate downstream at a transition 26. The inlet 12 may be connected to an outlet of a motive pump (not shown). A restriction 18 in the conduit 14 forms a nozzle through which the fluid flows when the motive pump (not shown) is operated. The nozzle 18 is arranged to introduce turbulence to the mixture along the flow path. The nozzle 18 may be a jet nozzle arranged to induce mixing of the mixture with a gas.

The restriction 18 divides the conduit 14 into an upstream end 14A upstream of the inlet 12 between the motive pump (not shown) and nozzle 18 and the downstream end 14B that terminates at a discharge. The mixing chamber 20 is downstream of the nozzle 18 and there may be a port 22 for admission of gas 24 into the mixing chamber 20. The motive pump (not shown), restriction 18, mixing chamber 20 and port 22 together comprise a phase separator.

In the embodiment of FIG. 3, the mixing chamber 20 defines a flow path 34 between the inlet 12 and the at least one outlet 28, 30. At least one magnet 32 is arranged to apply a magnetic field to the mixture along the flow path. The at least one magnet are in the embodiment shown a plurality of permanent magnets, which may be, for example, neodymium magnets. Various materials may be used for the magnets so long as they produce sufficient magnetic fields to provide increased separation. The mixing chamber should preferably be made from a material that does not significantly interfere with the magnetic fields, or structured in a way that prevents such interference, such as by applying ferromagnetic material near magnets to enhance the fields but avoiding extending the ferromagnetic material between opposite magnet poles to avoid short-circuiting the fields through the ferromagnetic material. As shown in FIG. 1, the mixing chamber 20 may have an inner housing 42 and an outer housing 44. The plurality of permanent magnets 32 may be mounted exterior to the inner housing 42. The plurality of permanent magnets may be placed in various arrangements and configurations so long as sufficient magnetic fields are applied by the magnets to increase separation of the mixture.

In the embodiment of FIG. 3 and FIG. 3A, the plurality of permanent magnets 32 include a plurality of magnet pairs 38, 40 arranged along a length of the mixing chamber 20. The arrangement of magnet pairs is shown with magnet pairs 38A and 40A, 38B and 40B, 38C and 40C, and 38D and 40D used as examples. Each one of each pair of the plurality of magnet pairs have complementary polarity to the other of the pair. In the exemplary embodiment shown, each of the magnets 38A, 38B, 38C and 38D represent north and each of the magnets 40A, 40B, 40C, and 40D represent south. These magnets are labelled distinctly from the remaining magnets shown for ease of reference only and it is not implied that the magnets separately labelled have distinct properties from the remaining magnets without distinct labelling. The magnets are arranged so as to have the magnet polarities attract, with the north pole in each pair arranged opposite to the south pole in the pair, in addition to the magnets being inverted with respect each other along the length of the mixing chamber 20, so as to have magnet polarities attract. Each pair of the plurality of magnet pairs is mounted on sides of the mixing chamber 20 at a certain distance along the length of the mixing chamber, meaning that of the magnets in each pair 38A and 40A, 38B and 40B, etc. are mounted opposite to each other. Each magnet pair of the magnet pairs have reversed polarities to an adjacent pair, meaning that, for example, the magnet 40B on one side of the mixing chamber is mounted between two other adjacent pairs with magnets on that side of the mixing chamber having reversed polarities, namely 38A and 38C. Similarly, the magnet 38B is mounted between two other adjacent pairs with magnets having reversed polarities, namely 40A and 40C. Testing data has found that installing the magnets on the mixing chamber 20 with reversed polarities to be more effective than if the magnets were installed with consistent polarities. To achieve adequate contact time between the oil water mixture and the magnetic field, multiple sets of magnets may be installed and arranged in series. Various configurations of magnets may be used to induce a sufficient magnetic field.

Figure 2:
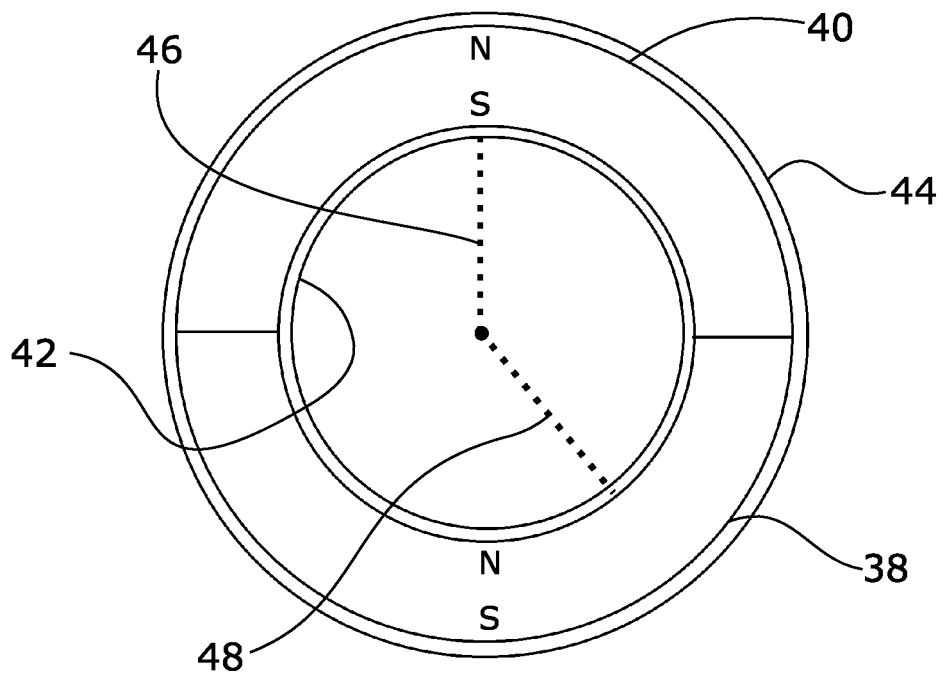
FIG. 2 is a cross-section of the separator of FIG. 1 through the Section A-A.

As shown in FIGS. 1 and 2, the mixing chamber 20 may be cylindrical and have a circular cross section. The plurality of permanent magnets 32 may be mounted to the inner housing 42 of the mixing chamber 20 and have a radius of curvature 48 matching a radius of curvature 46 of the inner housing 42. The plurality of permanent magnets may be mounted between the inner housing 42 and the outer housing 44. A plurality of inert spacers 36 (FIG. 3) may be placed between adjacent pairs of the plurality of magnet pairs 38, 40 along the length of the mixing chamber 20. The magnets are to be inserted and held in place using the inert packing media 36 where the curvature of the magnet face in contact with the mixing chamber surface is designed to match the outside circumference curvature of the pipe that forms the mixing chamber. The spacing of magnets is adjustable, with the typical spacing between magnets on the order of 1 inch to 2 inches. The spacing between the magnets and the strength, size, placement, and shape of the magnets may be chosen based on the desired application.

The permanent magnets installed against the face of the mixing chamber 20 can be placed in a manner to cover either partially or fully cover the outside circumferential area of the mixing chamber 20. Permanent magnets installed to fully cover the outside circumferential area produce the strongest magnetic field intensity. In the embodiment in FIG. 2, each pair of the plurality of magnet pairs 38, 40 may together fully extend around the inner housing 42 of the mixing chamber.

The plurality of permanent magnets 32 may be strong neodymium permanent magnets, with a rated Gauss level between 3,000 to 5,000. Higher Gauss levels are achievable by further coupling the permanent magnets with alternating current electromagnets. The magnets are mounted to the exterior surface of the mixing chamber 20 of the phase separator between its inner housing 42 and outer housing 44.

The fluid treatment separator 10 may be used to treat a mixture containing at least oil and water. The mixture is supplied into the inlet 12 of the phase separation device via the nozzle 18 thereby inducing turbulence in the mixture. The magnetic field is applied to the mixture inside the mixing chamber of the phase separation device to cause at least partial separation of the oil and water of the mixture, followed by oil droplet agglomeration.

The oil-in-water stream exits the nozzle of the phase separator from where it is mixed with an induction gas from where the mixture enters the mixing chamber 20 of the phase separator. The induction gas may be, for example, air, natural gas, hydrogen, or purge gas. Once in the mixing chamber 20 the mixture may be exposed to extreme turbulence and to the permanent magnetic field produced from the installation of strong neodymium magnets 32 on the outside of the mixing chamber, between the inner and outer housings 42, 44. As it travels down through the mixing chamber, the mixture is exposed to an alternating magnetic field created by having installed the permanent magnets 32 with reversed polarities and separated by inert spacing packing 36.

The oily water as it conveyed through the mixing chamber 20 of the phase separator, passes through both magnetized and relatively non-magnetized regions. The magnets are to be installed along the length of the mixing chamber where the mixing chamber length has been modified to achieve the required contact time for the oily water with the magnetic field. Factors found to affect the performance of the magnetic field with respect to oil water separation are time, temperature, and flowrate. The permanent magnets are to be installed to alternate the polarity at the surface of the mixing chamber. The mixing chamber 20 may have a length to internal diameter ratio of at least 20:1 or 40:1, preferably in the range 50:1 to 60:1.

In the embodiment shown in FIG. 4, the at least one magnet may be an electromagnet 52, for example, an alternating current electromagnet installed on the outside pipe of the mixing chamber of the phase separator between the inner and outer housings 42, 44. A transformer 54 may be connected to the electromagnet 52 through wires 58. The transformer 54 may be configured to receive power from a power source 56, such as a standard AC power source.

The electromagnet may be installed by wrapping the outside surface of the mixing chamber for its length with insulated magnetic wire. The wire may be minimum 28 gauge. The length of wire, the number of turns of the wire and the gauge of the wire may be chosen based on the desired application and other variables such as the width and length of the mixing chamber. The more turns of magnetic wire, the stronger the magnet. The length of mixing chamber will be sized based on fluid contact time with the magnetic field and the length required to cause separation of the oil from the fluid stream by way of the extreme turbulent action within the phase separator. The two wires magnetic wire wrap 58 may be connected to a step-down transformer 54, rated for 120 volts. The transformer 54 may be connected to an alternating current. The AC electromagnet may obtain its power from a standard 120-volt, 60 hertz electric power outlet. The electromagnetic field will be created when system power is turned on. While operating, the alternating current may reverse direction every 120 seconds, or other chosen time interval, resulting in a reversal of AC magnet polarity. The constant changing of the magnet north and south poles produces an alternating magnetic field over time. The intensity of the magnet field can be increased by increasing the current amperage. The phase separator may be constructed of ferrous steel or other conductive material to allow the AC magnets to operate. A connection or connections may be used to permit the grounding of the device at the inlet and discharge nozzles of the device.

In operation, the oil-in-water stream exits the nozzle 18 of the phase separator from where it is mixed with the induction gas 24 from where the mixture enters the mixing chamber 20 of the phase separator. Once in the mixing chamber 20 the mixture is exposed to both extreme turbulence and to an electromagnetic field produced from the stepping down of alternating power through the transformer 54 to generate an alternating current within a wrap of electrical wiring 52 on the outside of the mixing chamber 20, between the inner housing 42 and the outer housing 44. The mixture as it travels down through the mixing chamber 20 is exposed to the alternating electromagnetic field created by turning on the electrical power.

In the embodiment shown in FIG. 5, the at least one magnet are a combination of permanent magnets 32 and at least one electromagnet 52. Treating oily water using magnetic fields derived from both permanent magnets and at least one AC electromagnet has been found to be more effective than if the magnet types were used individually. To equip a phase separator with both styles of magnet types, the alternating current electromagnet may be first installed on the outside pipe of the mixing chamber of the phase separator followed by the installation of permanent magnets. The permanent magnets and electromagnet may be installed in the reverse order. The oily water as its passes through mixing chamber will be exposed to both a permanent magnetic field alternating in space and to a magnetic field from the electromagnet alternating in time.

In operation, the oil-in-water stream exits the nozzle of the phase separator from where it is mixed with an induction gas from where the mixture enters the mixing chamber 20 of the phase separator. Once in the mixing chamber 20, the mixture is exposed to both extreme turbulence, to a permanent magnetic field and to an electromagnetic field produced from the installation of inverted strong neodymium magnets 32 on the outside of the mixing chamber, and from the stepping down of alternating power through the transformer 54 to generate an alternating current within the wrap of electrical wiring 52 on the outside of the mixing chamber 20, between the inner housing 42 and the outer housing 44. The mixture as it travels down through the mixing chamber 20 is exposed to both a permanent magnetic and an alternating electromagnetic field. The electromagnetic field is produced from the turning on the electrical power.

Figure 6:
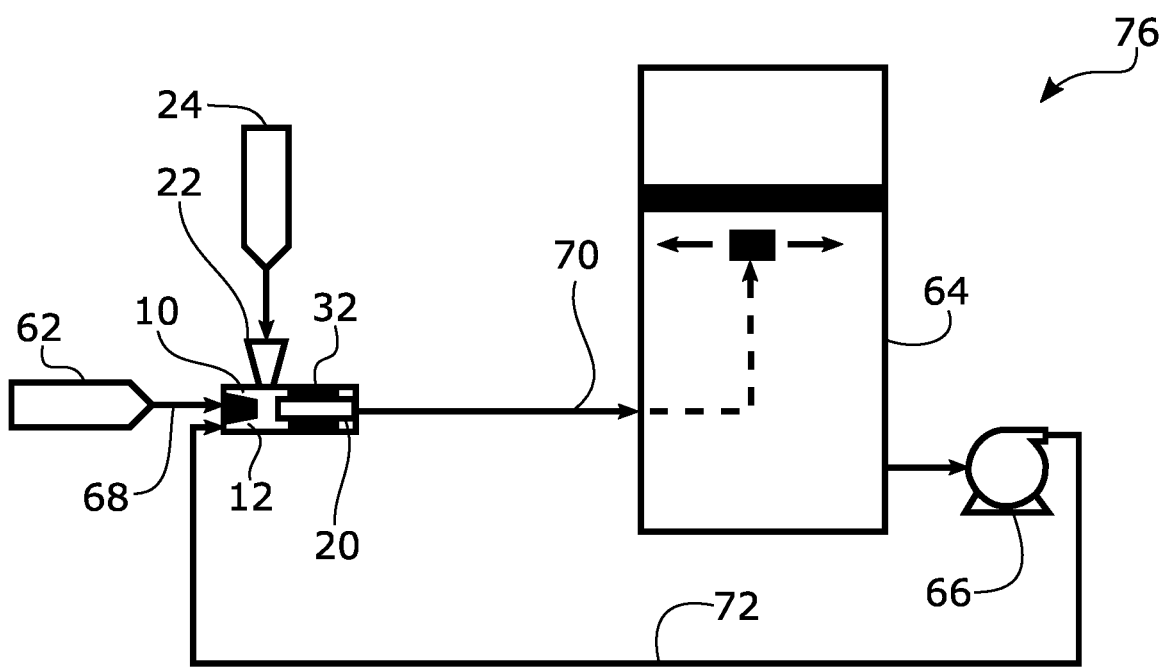
FIG. 6 is a detailed schematic, not to scale, of a fluid treatment system incorporating a fluid treatment separator.
Figure 7:
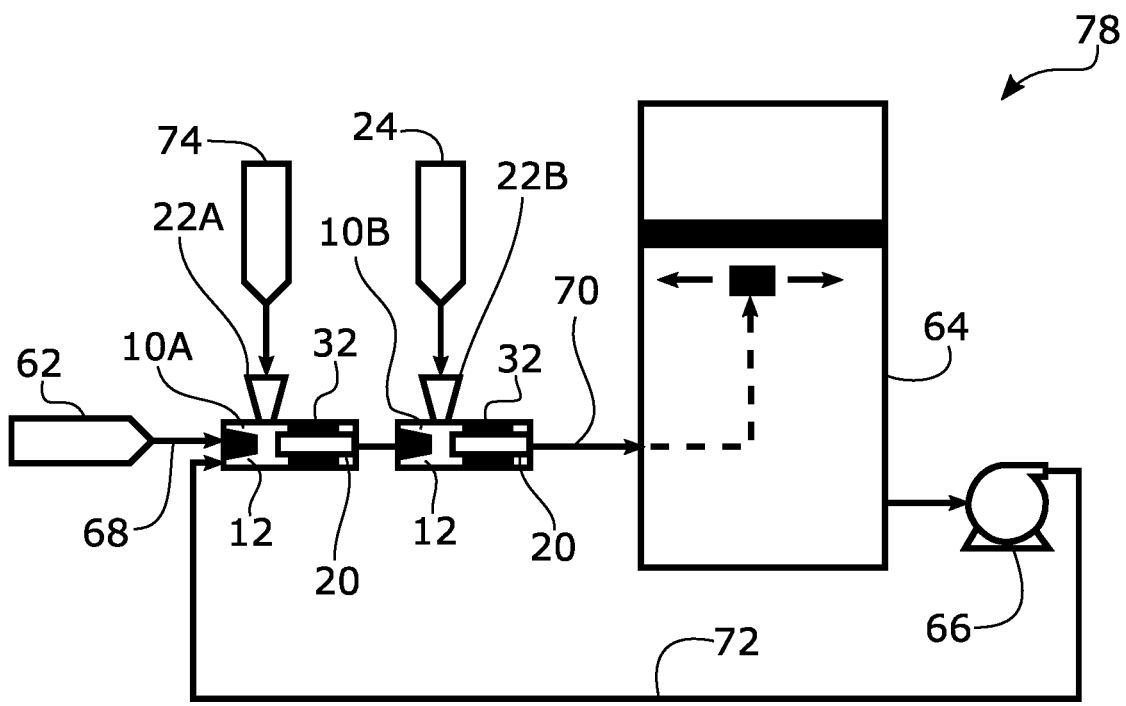
FIG. 7 is a detailed schematic, not to scale, of a fluid treatment system incorporating multiple fluid treatment separators.

In the embodiments of FIGS. 6 and 7, embodiments of the fluid treatment separator 10 are shown incorporated into fluid treatment systems 76 and 78.

In FIG. 6, a feed of oily water and/or tailings 62 is fed through piping 68 into the fluid treatment separator 10. The fluid treatment separator 10 has at least one magnet 32, which may be an electromagnet or a plurality of permanent magnets or both. The induction gas 24 may be introduced into the separator 10 through the port 22. The treated fluids may then pass through piping 70 to be further treated in a separation vessel or fluid treatment separator 64.

The fluid treatment system 76 may include one or more phase separators and one or more other separation apparatuses, such as a centrifuge, hydro-cyclone, separation vessels or other fluid treatment apparatus. Any number of additional secondary apparatus may be used as necessary to affect an adequate phase separation. The fluid treatment system 76 may include a series of connected combinations of phase separators connected together with multiple separation vessels. Fluid supplied into the fluid treatment separator 64 should be mixed fluid and supplied to the separator under motive force. A motive pump 66 may return treated fluid back to the fluid treatment separator 10 for additional treatment of the mixture.

In FIG. 7, an embodiment of a fluid treatment system 78 includes multiple fluid treatment separators 10A and 10B each having at least one magnet 32 which may be an electromagnet or a plurality of permanent magnets or both. Various combinations of permanent magnets, electromagnets, or both may be used in each fluid treatment separator. More than two fluid treatment separators may be connected in series. Pressurized hot dilution water 74 may be introduced into the first fluid treatment separator 10A through a first port 22A and induction gas may be introduced into the second fluid separator 10B through a second port 22B.

In embodiments of the apparatus, system and method disclosed, improvements in performance may be obtained with respect to: a) Oil/water separation, b) Bitumen/tailings separation, and c) Slop oil/solids separation. Embodiments of the apparatus, system and method may be used in additional applications such as: d) Oil refining for sales oil production, e) Slop oil refining for crude oil/sales oil production, and f) Mineral processing.

The magnetized fluid treatment separators 10, 10A and 10B may be installed in various configurations. The separators 10, 10A, 10B may be installed directly downstream of a feed of oily water and/or tailings, for example, through piping 68, or may treat a feed of previously treated fluid mixture, for example, through piping 72. In some cases, the fluid mixture may be treated by the separators 10, 10A, 10B in multiple passes, including treatment of an initially untreated mixture of fluids followed by one or more additional treatments of the treated mixture. The inlet pipe 68 may be used to connect the inlet to a feed of untreated tailings.

In various embodiments, each of the following configurations of fluid treatment systems may be used, including installation of the magnetized phase separator on the inlet feed to a single step or multiple step separation process. The separators may be fed mixtures directly from an oily water feed 62. The untreated oil/water mixture or slurry or tailings may be exposed to: a) High turbulent mixing, b) Mixing with induction gas (air, natural gas, hydrogen, or purge gas), and c) Exposure to a magnetic field, the magnetic field being an alternating magnetic field and/or fixed magnetic field.

The installation of the magnetized phase separator on a recycle loop that is connected to and from an oil/water separation vessel that can consist of a tank or separation vessel. The separators may be fed previously treated mixtures, for example, as fed through the loop 70, 72, with or without the initial feed 62 being fed through the magnetized phase separators. The piping 70 and 72 form a return loop of piping connecting one of the at least one outlets of the phase separator 10 with the inlet 12 to provide a return path to allow the application of the magnetic field to the mixture through the mixing chamber in multiple passes. In these embodiments, the oil/water mixture or slurry or tailings may be exposed to: a) High turbulent mixing, b) Mixing with induction gas (air, natural gas, hydrogen, or purge gas), and c) Exposure to a magnetic field, the magnetic field being an alternating magnetic field and/or fixed magnetic field.

The applicant has found through bench scale testing that recycling the feed through the phase separator equipped with magnets on a continuous basis to expose the feed to a magnet field for long periods of time at high magnetic field intensities may cause the following improvements over comparable methods without magnetic fields: a) Reduction in fluid viscosity, b) Reduction in power consumption, c) Oil droplet agglomeration to increase oil/water separation through: (i) Increasing rise due to increase oil droplet size, and (ii) Increasing oil recovery to achieve 99% removal, which represents an increase in removal of 1 to 2% over that of the phase separator not equipped with magnetic technology.

Processes which treat both an initial feed of untreated mixture as well as additional treatment(s) of a treated mixture may enhance performance by the addition of oil refining, whereby the feed is continuously exposed to the magnetic field for continued oil droplet agglomeration and the dropping out of contaminants, such as suspended solids, from the oil phase where they partition into the water phase. This is particularly important as the oil concentration in the recycle stream is reduced. Exposure to the magnetic field will cause oil attraction, thereby helping to overcome the issue of reduced contact frequency which is problematic for low oil concentrations.

The treatment of both an initial feed and one or more recycled feeds may be particularly useful for installation on an existing recovered oil tank, where tank headspace gas can be inducted into a recycle feed, consisting of a concentrated oil with a high water and solids content where it does not yet qualify as a sales oil. Recycling and exposing this concentrated oil stream to a high intensity magnetic field for long periods of time is a method of oil refining, separating out the water and solids phase from the concentrated oil phase. In the case of concentrated oil or slop oil phase, the recycle mixture may have to be injected into a water zone located within the bottom portion of the tank to facilitate rapid escape of the water and solids from the oil phase, to avoid viscosity separation hinderance issues. Recommended recycle rates can be as high as 50% of the feed stream flowrate.

The same is also true in the processing of tailings. Recycling the tailings using treatment of both an initial mixture and treatment of one or more recycled streams provides a method of tailings refining, to further reduce the oil or bitumen content in the tailings through prolong contact time with a high intensity magnetic field. In a tailings application, either induction gas or dilution water (warm or hot) or using two phase separators arranged in series, as shown in the embodiment of FIG. 7 with the first inducting a pressurized dilution water followed by a second phase separator inducting gas, can be inducted into the phase separator as a secondary flow to facilitate escape of the oil or bitumen from the slurry phase within the separation vessel through reducing the slurry concentration, thus reducing the separation hinderance affect cause by the interference of high particle (solids) concentrations. Dilution water addition is a method of altering the slurry matrix.

Treatment of an initial mixture and one or more recycled mixtures can be conducted on single step oil/water or tailing separation stage or on multiple oil/water or tailing separation stages arranged in a cascade flow arrangement. The dilution water 74 into the first phase separator will need to be pressurized to a lower pressure than the motive pump 66 to preserve system pressure, thus avoiding excessive headloss at the inlet of the second phase separator. Treating multiple passes of fluid mixtures using an magnetized separator may promote: a) Tailings refining, b) Feed dilution to increase compositional separation in the separation vessel, c) Feed heating, d) Slurry matrix alteration to reduce feed solids concentration, e) Increased contact time with a high intensity magnetic field through a recycled feed, f) Process water treatment enhancement, g) enhanced oil droplet agglomeration, h) High turbulent mixing of the feed with both: (1) Induction gas collected from the tank headspace and (2) Dilution water (warm or hot), which can consist of recovered and recycled process water.

Research conducted by the applicant indicated that a key parameter was the contact time to which the feed is exposed to the magnetic field. Based on the testing conducted, process parameters found to enhance oil agglomeration and separation included: a) Flowrate achieving high line velocity, b) Contact time with the magnetic field, c) Magnetic field intensity: the higher the intensity, the higher the system performance, and d) Alternating magnetic field versus a fixed magnetic field, in which an alternating magnetic field performed better when other parameters were equal.

Embodiments of the fluid phase separator 10 may improve performance in the separation and recovery of oil from water. Incorporation of permanent magnetic and/or electromagnetic fields may enhance the efficiency of the phase separator in removing oil from water and improving the demulsification of oil in water. Exposure of water-in-oil emulsions to permanent magnetic and electromagnetic fields with high induction levels, may increase oil removal efficiencies to the order of 99%. Testing suggests that the existing performance of the phase separator in oil water separation and recovery may be improved from its present capability of a low 95% to 99% oil removal and recovery. The incorporation and utilization of magnetic technology may enhance oil droplet agglomeration, to improve oil water gravity separation within the separation cell. As described herein, multiple designs for the utilization of magnetic technology may be used. For example, positive impacts magnetic fields may have on demulsification including the following:

(a) An electromagnetic field contributes to heating and lowering the viscosity of the oil which in turn enhances the coalescence process. The increase in temperature reduces the interfacial surface tension.

(b) An electromagnetic field contributes to molecular polarization of the oil components to enhance the coalescence process. The efficiency of the process is directly related to the intensity and frequency of the electromagnetic field in relation to the frequency of the oscillation of the polar oil molecules. When the two frequencies are equal or close to equal, the structure of the high molecular weight oil compounds may be further broken down or destroyed.

(c) The electromagnetic field causes small water droplets to either move towards each other or to collide with each other due to the electrostatic forces, such as dipole-dipole interaction and dielectrophoretic force, acting on them. As a result, the merging and coalescence of those droplets will increase the droplet size and eventually lead to settling and separation of water from the oil phase.

(d) Electrostatic separation is be further expedited by using elevated temperature because some properties such as density, viscosity, and dielectric constant become more favorable for separation as the temperature of the fluid increases.

Benefits of embodiments of the apparatus and methods may include, inter alia, the following. Oil may be extracted from an oily water/slurry at a low operating cost as the system processes the waste stream at initially ambient temperatures. A substantial reduction in chemical consumption for the client may be achieved. The system and method may be configured for a new installation or inserted into the clients existing infrastructure in most cases. The retention of oil from existing production may be increased and the percentage of oil to be re-injected as waste into disposal wells may be reduced. The apparatus and method may address existing waste stream accumulations as well as minimizing future issues. The apparatus and method may clean both the fines and accompanying process water immediately, recovering most of the available water for process recycling or release.

Exposure of oily produced water derived from hydraulic fracturing to magnetic fields is a method of promoting oil droplet agglomeration, to grow the oil droplet size, which allows separation by gravity using low-cost technology in the absence of producing a secondary waste stream in addition to the recovered oil.

Immaterial modifications may be made to the embodiments described here without departing from what is covered by the claims.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

We claim:

1. A fluid treatment separator for treatment of a mixture containing at least oil and water, comprising:
   a mixing chamber comprising:
   i) an inlet and at least one outlet, the mixing chamber defining a flow path between the inlet and the at least one outlet, the mixing chamber having a length and an internal diameter, a ratio of the length to the internal diameter of the mixing chamber being at least 20:1, and the mixing chamber being made from a non-porous ferromagnetic material; and
   ii) the inlet including a nozzle forming a restriction arranged to introduce turbulence to the mixture along the flow path; and
   at least one magnet arranged to apply a magnetic field to the mixture along the flow path in which the at least one magnet is placed along the mixing chamber for a distance of at least 20 times the internal diameter of the mixing chamber, and in which the at least one magnet is adapted to heat the mixture through the application of an electromagnetic field along the distance of the mixing chamber to increase oil agglomeration, and water and oil separation of the mixture.

2. The fluid treatment separator of claim 1 in which the at least one magnet comprises a plurality of permanent magnets.

3. The fluid treatment separator of claim 2 in which the plurality of permanent magnets comprises neodymium magnets.

4. The fluid treatment separator of claim 2 in which the mixing chamber comprises an inner housing and the plurality of permanent magnets are mounted exterior to the inner housing.

5. The fluid treatment separator of claim 4 in which the mixing chamber is cylindrical and the plurality of permanent magnets are mounted to the inner housing of the mixing chamber and have a radius of curvature matching a radius of curvature of the inner housing.

6. The fluid treatment separator of claim 4 in which the mixing chamber further comprises an outer housing and the plurality of permanent magnets are mounted between the inner housing and the outer housing.

7. The fluid treatment separator of claim 2 in which the plurality of permanent magnets comprise a plurality of magnet pairs arranged along the length of the mixing chamber, each one of each pair of the plurality of magnet pairs having opposite polarity to the other of the pair.

8. The fluid treatment separator of claim 7 in which each pair of the plurality of magnet pairs is mounted on sides of the mixing chamber at a certain distance along the length of the mixing chamber, and in which each magnet pair of the magnet pairs have reversed polarities to an adjacent pair.

9. The fluid treatment separator of claim 7 in which each pair of the plurality of magnet pairs together fully extend around the mixing chamber.

10. The fluid treatment separator of claim 7 further comprising a plurality of inert spacers placed between adjacent pairs of the plurality of magnet pairs along the length of the mixing chamber.

11. The fluid treatment separator of claim 1 in which the at least one magnet comprises an electromagnet.

12. The fluid treatment separator of claim 11 further comprising a transformer connected to the electromagnet, and the transformer configured to receive power from a power source.

13. The fluid treatment separator of claim 1 in which the at least one magnet comprises a combination of permanent magnets and at least one electromagnet.

14. The fluid treatment separator of claim 1 in which the nozzle is a jet nozzle arranged to induce mixing of the mixture with a gas.

15. The fluid treatment separator of claim 1 further comprising a return loop of piping connecting one of the at least one outlets with the inlet to provide a return path to allow the application of the magnetic field to the mixture through the mixing chamber in multiple passes.

16. The fluid treatment separator of claim 1 further comprising an inlet pipe for connecting the inlet to a feed of untreated tailings.

17. A fluid treatment system, comprising:
   first and second fluid treatment separators each as described in claim 1,
   in which one of the at least one outlets of the first fluid treatment separator is in fluid connection with the inlet of the second fluid treatment separator.

18. The fluid treatment system of claim 17 further comprising a separation vessel downstream from one of the at least one outlets of the second fluid treatment separator.

19. The fluid treatment separator of claim 1 in which the nozzle has a uniform internal diameter.

* * * * *